US012692810B2

(12) United States Patent
Charbonnel et al.

(10) Patent No.: US 12,692,810 B2
(45) Date of Patent: Jul. 28, 2026

(54) SYSTEM AND METHOD FOR ADAPTIVE CONTROL OF AMMONIA-NOx RATIO

(71) Applicant: Caterpillar Inc., Peoria, IL (US)

(72) Inventors: Sylvain J. Charbonnel, Peoria, IL (US); Oscar J. Gonzalez Villarreal, San Antonio, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/982,396

(22) Filed: Dec. 16, 2024

(65) Prior Publication Data

US 2026/0168418 A1 Jun. 18, 2026

(51) Int. Cl.

*F01N 3/20* (2006.01)
*F01N 9/00* (2006.01)
*F01N 11/00* (2006.01)
*F02D 41/00* (2006.01)
*F02D 41/14* (2006.01)

(52) U.S. Cl.

CPC ......... *F01N 3/208* (2013.01); *F02D 41/1495* (2013.01); *F01N 3/206* (2013.01); *F01N 3/2066* (2013.01); *F01N 9/007* (2013.01); *F01N 11/007* (2013.01); *F01N 2430/06* (2013.01); *F01N 2560/021* (2013.01); *F01N 2560/026* (2013.01); *F01N 2560/06* (2013.01); *F01N 2900/04* (2013.01); *F01N 2900/0416* (2013.01); *F01N 2900/1402* (2013.01); *F01N 2900/1614* (2013.01); *F01N 2900/1616* (2013.01); *F02D 41/0052* (2013.01); *F02D 41/146* (2013.01); *F02D 2200/0811* (2013.01)

(58) Field of Classification Search

CPC combination set(s) only.
See application file for complete search history.

(56) References Cited

U.S. PATENT DOCUMENTS

| | | | | |
|---|---|---|---|---|
| 9,631,538 | B2 | 4/2017 | Gady et al. | |
| 9,790,835 | B1 * | 10/2017 | Wu | F01N 3/208 |
| 10,167,762 | B2 | 1/2019 | Wang et al. | |
| 11,105,236 | B2 | 8/2021 | Shead et al. | |
| 2008/0302093 | A1 | 12/2008 | Montgomery et al. | |
| 2011/0005209 | A1 * | 1/2011 | Gady | F01N 3/103 60/331 |

(Continued)

FOREIGN PATENT DOCUMENTS

| | | | |
|---|---|---|---|
| DE | 102013205814 | B4 | 12/2015 |
| WO | 2023141293 | A1 | 7/2023 |

*Primary Examiner* — Binh Q Tran

(57) ABSTRACT

An ammonia to NOx ratio (ANR) control system includes an internal combustion engine configured to combust fuel, a valve configured to provide the fuel to the internal combustion engine, and a selective catalytic reduction (SCR) catalyst connected to the internal combustion engine to receive exhaust generated by combustion of the fuel with the internal combustion engine. The system also includes a reductant injector configured to inject reductant for the SCR catalyst, a sensor connected downstream of the SCR catalyst, and a controller. The controller may be configured to: receive NOx level signals or $NH_3$ level signals from the sensor, generate commands for controlling the reductant injector, and determine, with a perturbation-based control algorithm and based on the NOx or $NH_3$ level signals, commands for controlling the reductant injector.

20 Claims, 5 Drawing Sheets

(56) References Cited

U.S. PATENT DOCUMENTS

| | | | | |
|---|---|---|---|---|
| 2011/0262329 | A1* | 10/2011 | Ofoli | B01D 53/90 422/177 |
| 2012/0017567 | A1* | 1/2012 | Geveci | F01N 13/0093 60/274 |
| 2012/0096837 | A1* | 4/2012 | Yacoub | F01N 3/208 60/274 |
| 2014/0056790 | A1* | 2/2014 | Geveci | F01N 3/208 422/105 |
| 2014/0301925 | A1* | 10/2014 | Korpics | F01N 3/2066 423/212 |
| 2015/0226102 | A1* | 8/2015 | Hsieh | B01D 53/9495 422/119 |
| 2017/0306827 | A1 | 10/2017 | Wu et al. | |
| 2019/0345861 | A1* | 11/2019 | Johansson | F01N 3/206 |

* cited by examiner

SYSTEM AND METHOD FOR ADAPTIVE CONTROL OF AMMONIA-NOx RATIO

TECHNICAL FIELD

The present disclosure relates generally to aftertreatment systems, and more particularly, to methods and systems for controlling a ratio of ammonia to NOx for an internal combustion engine.

BACKGROUND

Internal combustion engines are useful in various situations to generate power for propulsion, to perform work, or to provide electrical energy. Internal combustion engines include sophisticated control systems to optimize fuel economy, improve transient response, and reduce undesired emissions. Internal combustion engines are also provided with aftertreatment systems, such as catalysts, that reduce emissions of nitrogen oxides (NOx), hydrocarbons, and methane ($CH_4$).

Engines configured for combustion of gaseous fuel, such as natural gas, can be coupled with a type of catalyst that is selected based on the combustion strategy employed by the engine. For example, engines configured to combust fuel with a lean air-to-fuel ratio can be paired with a selective catalytic reduction (SCR) catalyst. These engines and catalysts are generally efficient and produce a relatively low level of emissions. However, these advantages are achieved by ensuring that the amount of reductant supplied to the SCR is appropriate for current engine and catalyst conditions. Elevated temperatures interfere with SCR dosing calculations and can cause the injection of more reductant, such as diesel exhaust fluid (DEF), for the SCR than is necessary. This over-injection of DEF can, in some circumstances, increase NOx emissions.

U.S. Patent Application Publication No. 2017/0306827 A1, published on Oct. 26, 2017 ("the '827 publication"), describes a system for detecting failure of a selective catalytic reduction (SCR) catalyst. Ammonia to NOx ratio (ANR) and an $NH_3$ slip level are calculated with the system and, together with conversion inefficiency values for the SCR catalyst, are used to determine when the SCR catalyst has failed. The system of the '827 publication uses ANR to identify failures, but does not describe adaptive control for seeking or adjusting ANR.

The methods and systems of the present disclosure may solve one or more of the problems set forth above or other problems in the art. The scope of the protection provided by the present disclosure, however, is defined by the attached claims, and not by the ability to solve any specific problem.

SUMMARY

In one aspect, an ammonia to NOx ratio (ANR) control system may include an internal combustion engine configured to combust fuel, a valve configured to provide the fuel to the internal combustion engine, and a selective catalytic reduction (SCR) catalyst connected to the internal combustion engine to receive exhaust generated by combustion of the fuel with the internal combustion engine. The system may also include a reductant injector configured to inject reductant for the SCR catalyst, a sensor connected downstream of the SCR catalyst, and a controller. The controller may be configured to: receive NOx level signals or $NH_3$ level signals from the sensor, generate commands for controlling the reductant injector, and determine, with a perturbation-based control algorithm and based on the NOx or $NH_3$ level signals, commands for controlling the reductant injector.

In another aspect, a method for controlling an ammonia-NOx ratio (ANR) for an internal combustion engine may include receiving a first signal from a sensor, the sensor being a NOx sensor or an $NH_3$ sensor, determining a first command for a reductant injector based on the first signal, adjusting the first command, and controlling the reductant injector based on the adjusted first command. The method may also include receiving a second signal from the sensor, determining a second command for the reductant injector based on the second signal, adjusting the second command, and controlling the reductant injector based on the adjusted second command, the adjustments to the first command and to the second command causing repeating variations in an amount of reductant injected via the reductant injector.

In yet another aspect, a system for controlling an ammonia to NOx ratio (ANR) for an internal combustion engine may include an internal combustion engine configured to combust gaseous fuel, an admission valve for providing the gaseous fuel to the internal combustion engine, a catalyst connected to the internal combustion engine to receive exhaust formed by combustion of the gaseous fuel with the internal combustion engine, and a NOx sensor configured to detect oxygen present in the exhaust or an $NH_3$ sensor configured to detect $NH_3$ present in the exhaust. The system may further include a controller configured to: receive signals output from the NOx sensor or from the $NH_3$ sensor, generate commands for controlling the admission valve, determine a desired ANR, and adjust the desired ANR by generating an adjusted ANR command that is above or that is below the desired ANR as part of an adaptive control strategy.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
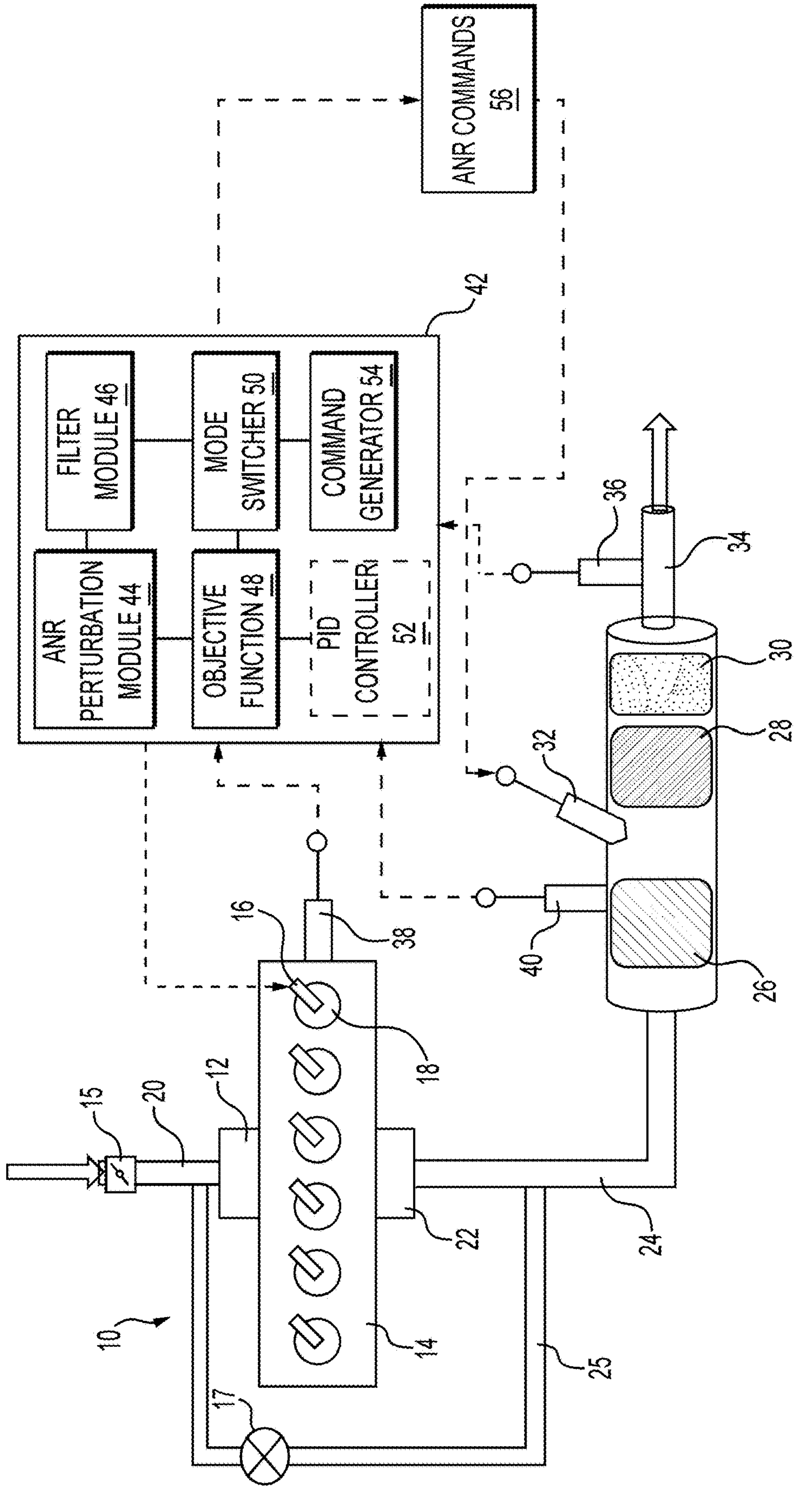
FIG. 1 is a schematic diagram of an adaptive control system for an internal combustion engine system, according to aspects of the disclosure.

FIG. 1 depicts a schematic diagram of an ammonia to NOx ratio (ANR) control system 10 for adaptive control of components associated with an internal combustion engine 14. As shown in FIG. 1, ANR control system 10 may include an intake air system, an exhaust system including one or more aftertreatment components, internal combustion engine 14, and an electronic control module (ECM) 42.

Internal combustion engine 14 may be configured to combust gaseous fuel, gaseous fuel being fuel supplied to a series of fuel valves, such as one or more admission valves 16, while in a gaseous state. In particular, engine 14 may be a lean burn engine, an engine intended to be operated at an air-fuel ratio that is greater than the stoichiometric ratio of air to fuel (e.g., at lambda values greater than 1.0). Gaseous fuel may include natural gas, hydrogen gas, propane, butane, methane, and others. Internal combustion engine 14 may include a plurality of cylinders 18, six cylinders 18 being shown. While admission valves 16 are shown in a configuration to directly supply fuel to a cylinder 18, as understood, valves 16 may be connected to intake manifold 12, intake passage 20, or at any suitable location downstream of an intake throttle valve (ITV) 15.

An air intake system for supplying air to internal combustion engine 14 may include an intake manifold 12 and an intake passage 20 located upstream of intake manifold 12. ITV 15, if present, may be connected upstream of intake manifold 12, a position of ITV 15 being configured to restrict an amount of air that flows to intake manifold 12.

An exhaust system for internal combustion engine 14 may include an exhaust manifold 22, an exhaust passage 24, one or more aftertreatment devices, and a reductant injector 32 configured to inject, for example, a reductant such as liquid containing urea (e.g., DEF). In the illustrated example, the aftertreatment system includes a first aftertreatment device 26, a second aftertreatment device 28, and a third aftertreatment device 30. At least one of the aftertreatment devices 26, 28, and 30 includes a selective catalytic reduction (SCR) catalyst. While three aftertreatment devices are shown in FIG. 1, a smaller or larger number of aftertreatment devices may be present. Further, while each of the aftertreatment devices is shown in a shared housing in FIG. 1, as understood, one, two, or another number of aftertreatment devices may be present in a separate housing.

First aftertreatment device 26 may include a diesel oxidation catalyst (e.g., in configurations where diesel fuel is used as a pilot fuel to facilitate combustion of gaseous fuel) and/or a particulate filter. In the illustrated configuration, first aftertreatment device 26 is positioned upstream of reductant injector 32. Second aftertreatment device 28 may include an SCR device that is configured to reduce nitrous oxide (NOx) emissions from exhaust generated with internal combustion engine 14. In the illustrated example, second aftertreatment device 28 is connected downstream of reductant injector 32. In particular, second aftertreatment device 28 may be connected immediately downstream of a reductant injector 32. Third aftertreatment device 30 may include an ammonia oxidation catalyst (AMOX), a NOx trap, a NOx catalyst, a NOx adsorber, and/or other aftertreatment devices useful for gaseous engines.

Reductant injector 32 may be configured to receive reductant from a tank (not shown) and inject the reductant to contact aftertreatment device 28. While a single reductant injector 32 is shown, as understood, multiple reductant injectors 32 may be provided. For example, an additional reductant injector may be provided for exhaust passage 24 to inject reductant upstream of first aftertreatment device 26.

An exhaust exit passage 34 may be connected downstream of aftertreatment devices 26, 28, and 30. If desired, the exhaust system may be configured for exhaust gas recirculation (EGR). Components for providing EGR capability may include an EGR passage 25 and an electronically-controlled EGR valve 17.

ECM 42 may be configured to control the operation of internal combustion engine 14 and associated systems. In particular, ECM 42 may generate commands for controlling ITV 15, admission valves 16, EGR valve 17, and reductant injector 32. If desired, ECM 42 may also generate signals for controlling the generation of a spark with a spark plug (not shown) connected to each cylinder 18, or for controlling diesel fuel injectors for injecting diesel fuel (e.g., as a pilot fuel that facilitates combustion of gaseous fuel within cylinders 18). ECM 42 may be connected to a sensor system of ANR control system 10 for monitoring conditions of system 10. The sensor system may include a NOx sensor or an $NH_3$ sensor, (e.g., a sensor 36) connected downstream of the SCR catalyst (e.g., second aftertreatment device 28), a temperature sensor 40 or other sensor(s) configured to measure a temperature of one or more of aftertreatment devices 26, 28, 30, and an engine speed sensor 38. In some aspects, the NOx or $NH_3$ sensor is a physical sensor connected downstream of device 28. A physical or virtual sensor may be used to determine a measurement of NOx upstream of aftertreatment device 28. When the upstream sensor is a virtual sensor, ECM 42 may determine an expected amount of NOx upstream of device 28 by use of suitable modeling techniques. The upstream NOx signals, whether generated by a physical sensor or virtual sensor, may enable ECM 42 to convert an optimal ANR target generated via the adaptive control techniques described herein to a dosing rate or dosing quantity of reductant injected with injector 32. Additional sensors of the sensor system may include additional temperature sensors, flow sensors, knock sensors, and others.

ECM 42 may encompass a single control module, or controller. However, as used herein, the term "controller" encompasses both single controllers or control modules, or a plurality of controllers or control modules. ECM 42 may embody a single processor or multiple processors that receive inputs, such as NOx levels or $NH_3$ levels from sensor 36, and generate outputs, such as commands for ITV 15, admission valves 16, electronically-controlled EGR valve 17, and reductant injector 32. ECM 42 may include a memory, a secondary storage device, a processor such as a central processing unit, or any other means for accomplishing a task consistent with the present disclosure, as described below. The memory or secondary storage device associated with ECM 42 may store data and software to allow ECM 42 to perform its functions, including the functions described with respect to method 500, also described below. Numerous commercially available microprocessors can be configured to perform the functions of ECM 42. Various other known circuits may be associated with ECM 42, including current monitoring circuitry, signal-conditioning circuitry, communication circuitry, and other appropriate circuitry.

As shown in FIG. 1, ECM 42 may be configured with modules (e.g., programming, algorithms, etc.) that allow ECM 42 to perform ANR control via an adaptive control strategy in which the control strategy is configured to adapt for changing conditions without use of a model representing the engine and/or aftertreatment system, such as a strategy that employs extremum seeking control. Modules of ECM 42 may include an ammonia to NOx ratio, or ANR, perturbation module 44, a filter module 46, an objective function 48, a mode switcher 50, an optional proportional-integral-derivative module 52, and a command generator 54. Modules 44-48, in conjunction with command generator 54, may generate ANR commands 56 that adjust the ANR associated with an SCR catalyst such as aftertreatment device 28 to seek an objective or to seek a minimum cost, as described below.

Perturbation module 44 may be configured to perturb, or adjust, commands for seeking a particular ANR. Perturbation module 44 may, for example, receive a desired ANR (e.g., a baseline or other desired ANR value, such as a value generated without the use of an adaptive control strategy), or a command for a desired ANR, and adjust this desired ANR by increasing or decreasing the desired ANR. These adjustments may be made in a repeating manner, resulting in fluctuations, which may be relatively small, in the ANR. These relatively small fluctuations may be, for example, fluctuations that result in a change of less than ±5% to the desired ANR once an optimum ANR command has been identified by maximizing an objective function, as described below. In particular, perturbation module 44 may cause repeated oscillations, each oscillation including at least one increased command and at least one decreased command. Perturbations generated with module 44 may allow ECM 42 to monitor how the adjusted commands impact the quantity of NOx or $NH_3$ detected with sensor 36.

Filter module 46 may include low pass filtering and high pass filtering functionality. High-pass filtering may be performed to remove bias from the output monitored by ECM 42 (e.g., filtering performed on the basis of NOx or $NH_3$ signals received from sensor 36 after injection of a desired amount of reductant with reductant injector 32). Low-pass filtering may reduce or eliminate the effect of noise on the adaptive control strategy implemented with ECM 42.

Objective function 48 may determine the goals of the adaptive control performed with ECM 42. In particular, objective function 48 may represent objectives or costs that represent desired or undesirable outcomes (e.g., increasing NOx values), respectively. In the example of a cost function, lower costs may be associated with more desirable outcomes, such as data from sensor 36 indicating that NOx content has decreased. While the phrase "objective function," is used herein and sometimes described as a function that represents goals, or objectives, as understood, the phrase "cost function" is also considered an objective function as a cost function also seeks beneficial or desired conditions by avoiding undesired outcomes.

In some aspects, objective function 48 may change over time or may be modified by a user. Objective function 48 may reflect a current operating mode of ANR system 10. Example operating modes may include a mode that prioritizes reduction of emissions such as NOx, a mode that prioritizes increased fuel economy, a mode that temporarily boosts power output by internal combustion engine 14, and others.

Mode switcher 50 may be configured to enable or disable adaptive control strategies, such as extremum seeking control, employed by ECM 42. When adaptive control is enabled, modules 44, 46, and 48 may be active and operable as described above. Mode switcher 50 may disable adaptive control and instead enable other control strategies, such as proportional-integral (PI) or proportional-integral-derivative (PID) control, for a period of time.

Mode switcher 50 may be further configured to enable and disable the adaptive control strategy employed with perturbation module 44, filter module 46, and objective function 48 based on current conditions of system 10. In particular, mode switcher 50 may enable adaptive control when the temperature measured via temperature sensor 40 exceeds a threshold temperature. This threshold temperature may be a temperature at which a non-adaptive control strategy (e.g., control via PID controller 52) becomes less reliable or less effective at achieving a particular objective, such as minimizing NOx. In some examples, mode switcher 50 may be configured to enable adaptive control when the temperature measured with sensor 40 is above a temperature threshold and disable adaptive control when the temperature drops below this temperature threshold. In other examples, mode switcher 50 may be configured to enable adaptive control when the measured temperature rises above a first threshold temperature and disable adaptive control when the measured temperature drops below a second temperature threshold that is lower than the first temperature threshold.

Commands from ECM 42 may be generated with command generator 54. These commands 56 cause a desired (e.g., target) ANR at aftertreatment device 28. This ANR may be targeted by generating outputs for one or more reductant injectors 32. For example, ANR may be increased by injecting a greater amount of reductant with injector 32 and decreased by injecting a lesser amount of reductant with injector 32.

Figure 2:
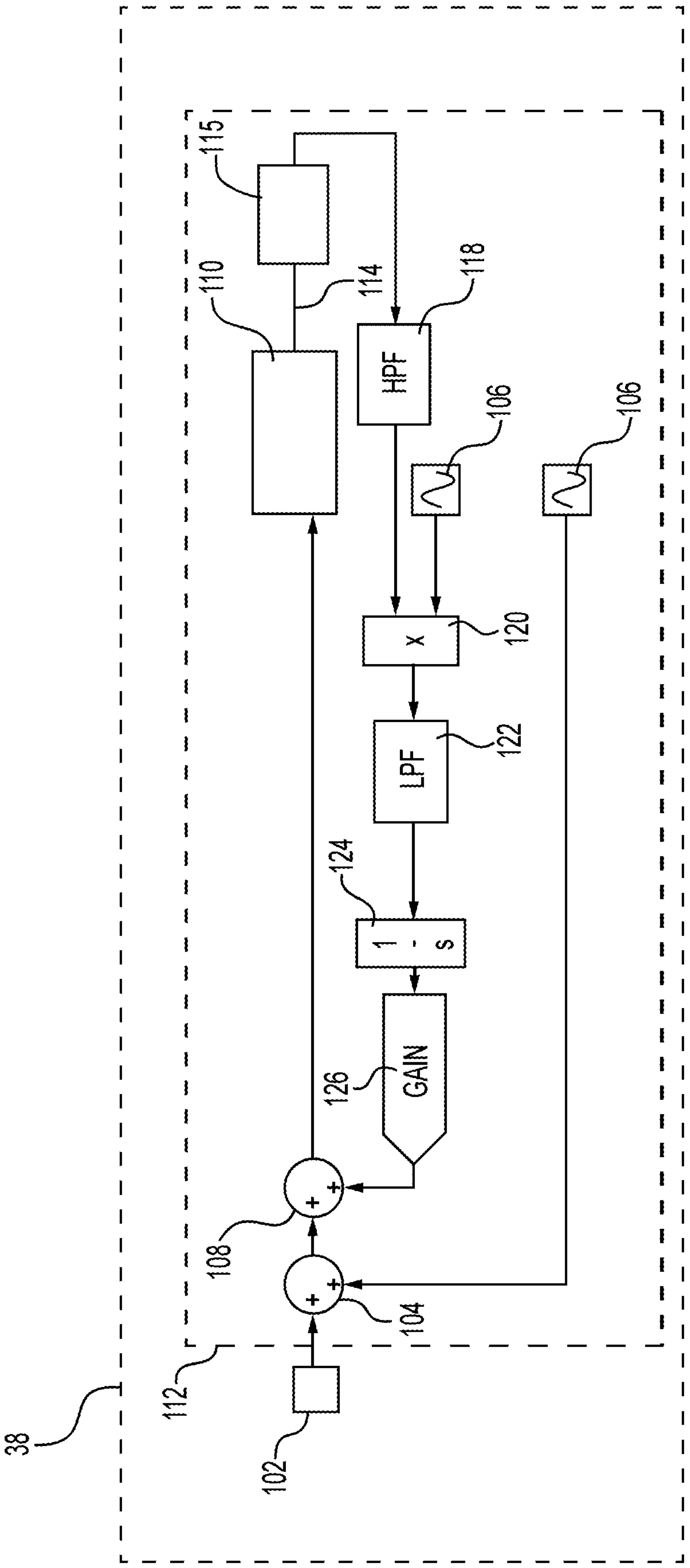
FIG. 2 is a block diagram of a controller for implementing adaptive control for the engine system of FIG. 1.

FIG. 2 is a block diagram illustrating an exemplary control strategy employed with ECM 42. Blocks or functions in FIG. 2 may correspond to one or more of perturbation module 44, filter module 46, objective function 48, and command generator 54. In particular, perturbation module 44 may be implemented via perturbation function 106 and command adjuster 104, filter module 46 may be implemented with high-pass filter 118 and LPF 122, objective function 48 may be implemented with objective function 115, multiplier 120, integrator 124, gain 126, and objective-seeking adjuster 108, and command generator 54 may correspond to generator 102 and adjuster 108 The operations illustrated in FIG. 2 may be performed when mode switcher 50 has enabled adaptive control.

In FIG. 2, an initial command and series of subsequent commands, such as commands for a desired ANR, are generated with command generator 102. Commands from generator 102 are output to a command adjuster 104 at which a perturbation function 106 is combined (e.g., via addition) with the command from generator 102, acting to increase the value set with generator 102 when the output of perturbation function 106 is positive, or to decrease the value set with generator 102 when the output of perturbation function 106 to command adjuster 104 is negative. This adjusted command is output from command adjuster 104 to an objective-seeking adjuster 108 that generates adjustments that seek to maximize objective function 48. In some aspects, perturbation function 106 is a sinusoidal function which causes consistent repeating fluctuations that change in magnitude and in sign in a consistent manner. However, in other examples, perturbation function 106 may employ other functions (e.g., saw tooth functions, stepped functions, linear functions, etc.) which cause some fluctuations in an increasing (positive) direction and some fluctuations in a decreasing (negative) direction.

An adaptive control loop 112 may cause the generation of an adjusted set point. The set point may be used by PID controller 52 for the generation of adjusted commands to control injector 32, and facilitate monitoring of an output 114 that results by implementing the adjusted command via plant 110. In adaptive control loop 112, plant 110 is shown to represent the components of ANR control system 10, such as engine 14 and an SCR catalyst. As understood, plant 110 is not included in, or modeled by, ECM 42. An output 114, received with objective function 115 via plant 110, may correspond to NOx or $NH_3$ content from sensor 36. Objective function 115 may be configured to generate and output costs associated with this NOx or $NH_3$ content within output 114.

Adaptive control may be implemented with adaptive control loop 112. In particular, adaptive control may be achieved by components in loop 112, including a high-pass filter 118, a multiplier 120, a low-pass filter 122, an integrator 124, a gain 126, command adjuster 104, and objective-seeking adjuster 108. At times when adaptive control is not enabled, commands, such as desired ANRs, determined with generator 102 may be used to set the ANR without adjustment by the elements of adaptive control loop 112.

Costs generated with objective function 115 may be received with a high-pass filter 118.

Multiplier 120 may multiply the output from plant 110 by the value of perturbation function 106, this function 106 being provided to facilitate the objective-seeking functionality of adaptive control loop 112. The value output from multiplier 120 may be received by LPF 122. LPF 122 may remove or reduce noise from this output. In particular, LPF 122 may remove or reduce measurement noise (e.g., noise introduced by sensors). Thus, LPF 122 may improve the stability of the adaptive control strategy employed by perturbation module 44, and may improve the speed at which outputs generated with perturbation module 44 arrive at optimal or near-optimal commands that satisfy the objective reflected by mode switcher 50.

Integrator 124 may integrate the signal output from multiplier 120 via LPF 122. This integration may allow command generator 102 to generate a command with a larger value when the previously-implemented command corresponds to a rising portion of an objective function (e.g., a location or portion of an objective function that, when plotted, has a positive slope). Integrator 124 may also be configured to cause command generator 102 to generate a command with a decreased value when the previously-implemented command corresponds to a falling portion of an objective function. Thus, when a previously-implemented command corresponds to a rising portion of an objective function, the value output from integrator 124 may be positive. When the previously-implemented command corresponds to a falling portion of an objective function, the value output from integrator 124 may be negative. The sign of the output from integrator 124 is not impacted by the gain 126 in embodiments where gain 126 is included in adaptive control loop 112.

Gain 126 is settable to increase or decrease how quickly the system moves to the optimum value, with larger values tending to facilitate more rapid identification of an optimal command. However, values for gain 126 that are too large may have an unfavorable impact on stability of the adaptive control strategy. It may therefore be advantageous to set the value of gain 126 accordingly.

Figure 3:
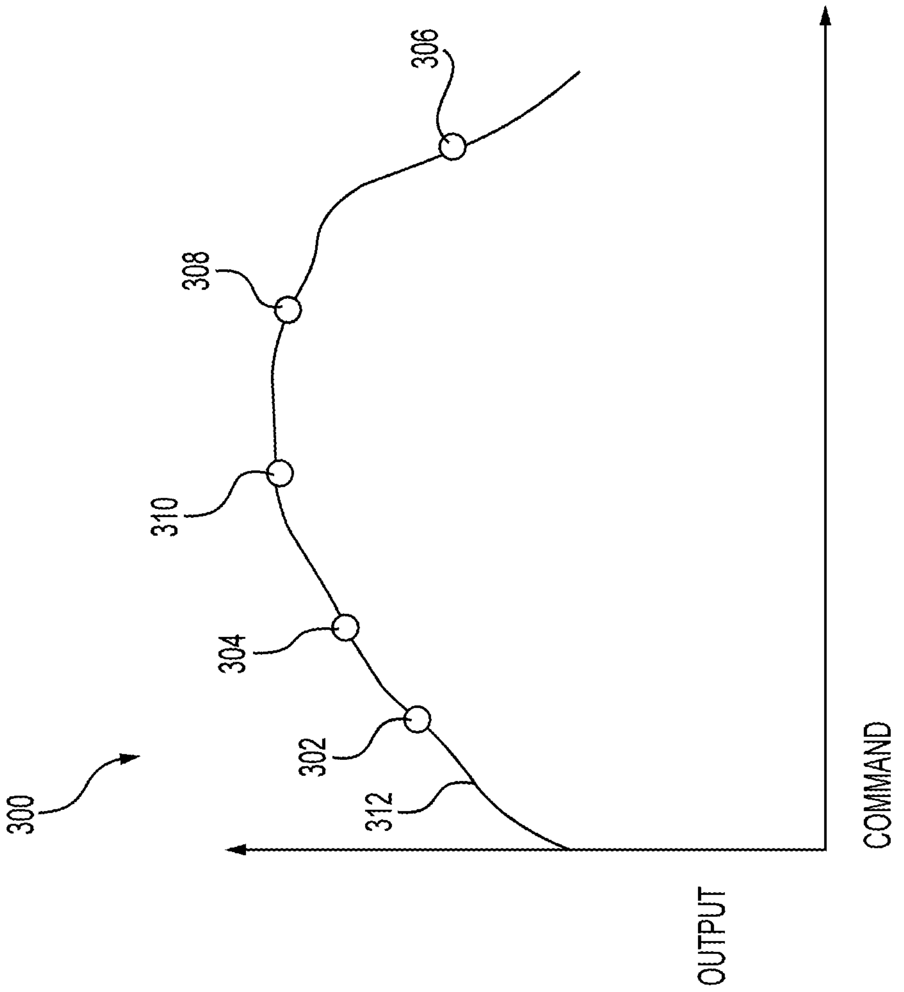
FIG. 3 is a chart illustrating commands selected via adaptive control for the engine system of FIG. 1 and outputs associated with the selected commands.

FIG. 3 illustrates a chart 300 that represents a plurality of potential commands (X-axis) that result in outputs (Y-axis). The commands represented by the X-axis in FIG. 3 the position of commands 302, 304, 306, 308, and 310 with respect to the X-axis, may be ANR commands. The outputs represented by position on the Y-axis may correspond to an objective (e.g., objective 312) represented with objective function 48 (FIG. 1), this objective resulting from the associated command. In chart 300 of FIG. 3, one output is illustrated and used to determine whether a particular command maximizes an objective. In other examples a plurality of different objectives may be represented by the objective function, such as objectives that tend to be maximized at the same or similar ANR.

With continued reference to FIG. 3, the objective includes a NOx objective 312. In some embodiments, objective 312 may be a $NH_3$ objective instead of an NOx objective. As the adaptive control strategy may be configured to identify the maximum of an objective function and the minimum of a cost function, the adaptive control strategy may seek the region or point where objective 312 is maximized. For example, ECM 42 may issue a command 302 that is located on an ascending portion of objective function 312. Based on determining that command 302 results in an output on ascending portions of objective function 312, ECM 42 may generate the next command with an increase in ANR to seek the maximum point of function 312, as described above with respect to adaptive control loop 112 (FIG. 2).

In another example, ECM 42 may issue a command 306 that also fails to maximize objective function 312. As command 306 is located on a descending portion of objective function 312, ECM 42 may determine, via adaptive control loop 112, that a command issued at a later time than command 306 should be adjusted such that the ANR is decreased. ECM 42 may generate a subsequent command, such as command 308, with a lower ANR (as represented by the position of command 308 on the X-axis). The process may continue as the adaptive control strategy implemented via perturbation module 44, filter module 46, objective function 48, and command generator 54 of ECM 42 identifies a command 310 that is at or near the maximum value of the objective function or the minimum value of the cost function.

The adaptive control strategy may enable ECM 42 to make relatively large changes to the commanded ANR when the output is located farther away from the peak of the objective function and smaller changes to the commanded ANR when the output is at or near the peak of the objective function. For example, ECM 42 may be configured to make a greater change to the ANR command 306 as compared to commands 304, 308, and 310. Further, once ECM 42 arrives at command 308 or 310 which are relatively close to the value of the peak of objective function 312, subsequent changes introduced via perturbation function 106 may be relatively small due to adaptive control loop 112. These small changes may further allow ECM 42 to follow, or adapt to, an objective function that changes over time. Thus, the adaptive control strategy may quickly seek an optimum value and track the optimum value even as the physical system changes (e.g., as the behavior of an SCR catalyst changes over its useful life, causing shifts in objective 312).

Figure 4:
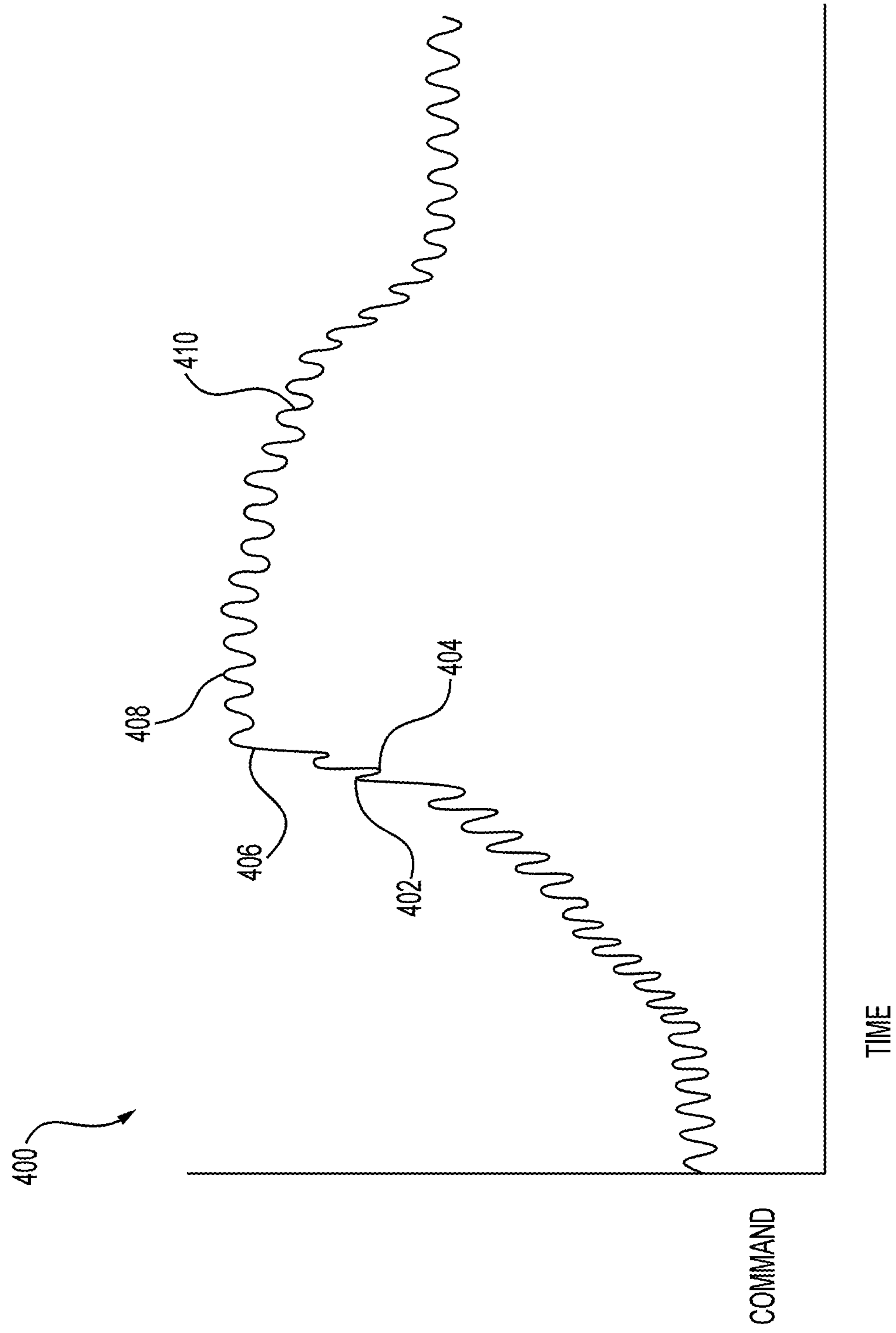
FIG. 4 is a chart illustrating commands selected over a period of time via adaptive control for the engine system of FIG. 1.

FIG. 4 is a chart representing example commands issued with command generator 54 of ECM 42 (FIG. 1) over time while an adaptive control strategy is employed. As can be seen in FIG. 4 commands 400 follow a general trend while exhibiting periodic peaks 402 and valleys 404 that are caused by perturbations applied with perturbation module 44, for example. FIG. 4 also illustrates a rapid increase 406 in commands (e.g., increasing ANR) until reaching a peak 408. This peak 408 may represent the time at which ECM 42 arrived at an optimal command in view of objective function 48 (e.g., a command corresponding to point 310 of FIG. 3). Following peak 408, commands may follow a more slowly-changing slope 410 that demonstrates gradual decreases until reaching portion 412. These changes illustrate the ability of ECM 42 to generate commands that respond to physical, chemical, or other changes to an SCR catalyst. The changes to commands along slope 410 and portion 412 are exaggerated for purposes of illustration. As understood, changes to the performance of an SCR catalyst (e.g., aftertreatment device 28) may take place over a relatively long period of time (e.g., multiple days, weeks, months, or years). In contrast, pairs of peaks 402 and valleys 404 may be separated from each other in a shorter period of time (e.g., milliseconds, seconds, minutes, or hours).

INDUSTRIAL APPLICABILITY

The disclosed aspects of the present disclosure may be applied to a variety of engines, and machines and/or vehicles having engines that generate power for propulsion, to move an implement, generate electrical energy, or perform other tasks. For example, the ANR control system of the present disclosure may enable adaptive control that generates commands that change over time in response to changing performance of one or more components of the system, such as changes in an SCR catalyst caused by increased temperature, in particular for SCR catalysts for machines that include internal combustion engines.

Figure 5:
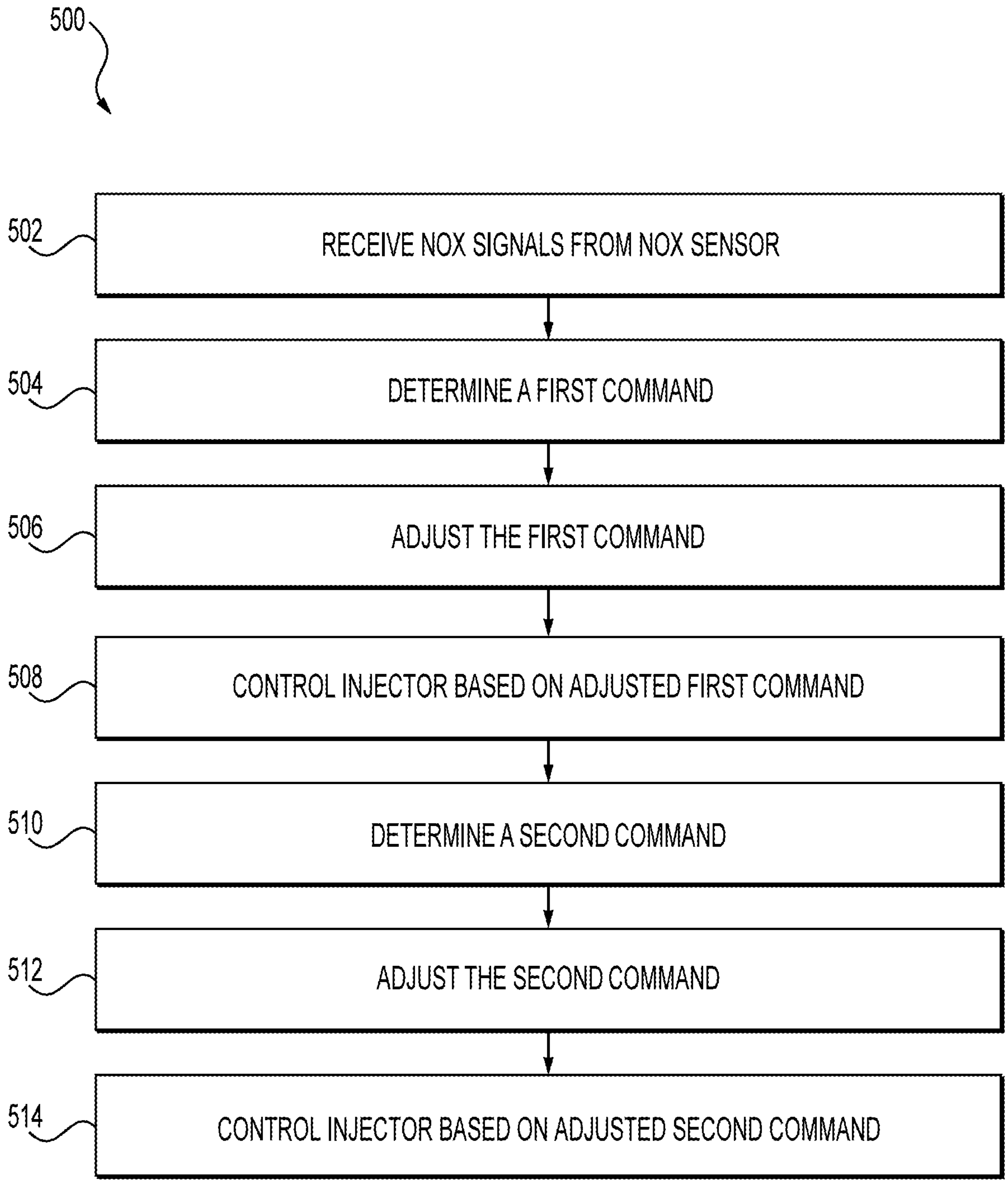
FIG. 5 is a flowchart of a method for controlling an ammonia-NOx ratio for an internal combustion engine

FIG. 5 is a flowchart showing a method 500 for controlling ammonia to NOx ratio (ANR), according to aspects of the disclosure. A step 502 may include receiving NOx signals or $NH_3$ signals from sensor 36 with ECM 42. Data from these signals may allow ECM 42 to determine the quantity of NOx or $NH_3$ in exhaust that exits engine 14. In particular, these signals may indicate a quantity or concentration of NOx or $NH_3$ at a location downstream of an SCR catalyst and downstream of reductant injector 32. Step 502 may be performed continuously while method 500 is performed such that updated NOx or $NH_3$ signals are received by ECM 42 prior to the generation of each adjusted ANR command.

A step 504 may include determining a first ANR command. In some aspects, this command, determined with command generator 54 and/or generator 102, represents the ANR that is expected to maximize objective function 48. This command is not, however, output by command generator 54 when mode switcher 50 has placed ECM 42 in a mode that employs adaptive control. In circumstances where mode switcher 50 applies a control strategy other than adaptive control (e.g., PI or PID control), the command from generator 102 may be output via proportional-integral-derivative module 52 and command generator 54. As described above, mode switcher 50 may enable adaptive control when temperature detected with sensor 40 is above a threshold temperature for enabling adaptive control and disable adaptive control when the temperature is below the threshold temperature.

A step 506 may be performed when adaptive control is performed with ECM 42. In particular, step 506 may include adjusting the first ANR command from step 504 with perturbation module 44. For example, as shown in FIG. 2, objective-seeking adjuster 108 may adjust an ANR command based on outputs from perturbation module 44, filter module 46, or objective function 48, and/or based on outputs from perturbation function 106, high-pass filter 118, multiplier 120, LPF 122, integrator 124, and gain 126. The adjustment may be performed as described above with respect to FIGS. 1 and 2, for example.

Once adjusted, the command may be output in a step 508. In some aspects, the command corresponds to an ANR and the ANR command 56 (FIG. 1) corresponds to a command for injector 32 of system 10.

Steps 510-514 may be performed in a manner similar to the description of steps 504-508, as described above. Further, updated NOx or $NH_3$ signals may be received prior step 510. In step 510, a second ANR command may be determined based on updated signals from sensor 36 and, if desired, based also on the first ANR command. In particular, in step 510, command generator 54 may determine the second ANR command based on determining whether the first ANR command resulted in an output that is on an ascending portion of an objective function (e.g., point 302; FIG. 3) or a descending portion of an objective function (e.g., point 306 or 308; FIG. 3). As described above, the sign of the signal output with integrator 124 may result in a second command that increases or decreases the ANR based on the output generated according to the first command or a command issued immediately prior generation of the second command (e.g., when one or more additional commands are issued between the first command and the second command).

In step 512, the second command may be adjusted. This adjustment may be made with command generator 54, as described above. In particular, step 512 may include combining perturbation function 106 with commands from generator 102 at command adjuster 104 and/or making an objective-seeking adjustment at objective-seeking adjuster 108. Following the adjustment, the adjusted command may be output in a step 514 with command generator 54.

In some aspects, adaptive control may allow for automatic adjustments to ammonia to NOx ratio (ANR). These adjustments may be made by controlling an amount of reductant present in an aftertreatment device. Adjustments to ANR may be performed without the need for manual intervention, and may reduce or eliminate the need to take measurements with separate emission measurement systems. Additionally, adjustments may be made when changes occur to the system, such as physical or chemical changes to an SCR catalyst. These adjustments may reduce or eliminate impacts of these changes. Adaptive control may further facilitate adjustments in response to changing fuel conditions, without the need to measure or estimate the methane content of new fuel. Adaptive control may be performed without the use of a model representing the system, and unlike a static map or lookup table, may automatically change over time. The adaptive control system may also allow the system to adapt to changes in the system other than to the received fuel or the activity of the catalyst, as the adaptive control strategy may continue to seek an objective that shifts due to other conditions.

It will be apparent to those skilled in the art that various modifications and variations can be made to the disclosed method and system without departing from the scope of the disclosure. Other embodiments of the method and system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. An ammonia to NOx ratio (ANR) control system, comprising:

an internal combustion engine configured to combust fuel;

a valve configured to provide the fuel to the internal combustion engine;

a selective catalytic reduction (SCR) catalyst connected to the internal combustion engine to receive exhaust generated by combustion of the fuel with the internal combustion engine;

a reductant injector configured to inject reductant for the SCR catalyst;

a sensor connected downstream of the SCR catalyst; and a controller configured to:

receive NOx level signals or $NH_3$ level signals from the sensor, generate commands for controlling the reductant injector, and determine, with a perturbation-based control algorithm that employs extremum-seeking control and based on the NOx or $NH_3$ level signals, commands for controlling the reductant injector for adjusting a position of the reductant injector according to the extremum-seeking control performed with the controller.

2. The ANR control system of claim 1, wherein the perturbation-based control algorithm generates commands for maximizing an objective function.

3. The ANR control system of claim 1, wherein the perturbation-based control algorithm generates commands for maximizing an objective function.

4. The ANR control system of claim 1, further including a temperature sensor configured to detect a temperature associated with the exhaust, the controller being further configured to enable the perturbation-based control algorithm in response to the detected temperature exceeding a threshold temperature.

5. The ANR control system of claim 4, wherein the controller is further configured to disable the perturbation-based algorithm when the detected temperature is below the threshold temperature.

6. The ANR control system of claim 1, wherein the perturbation-based control algorithm generates a first adjustment that causes an increase in the ANR and a second adjustment that causes a decrease in the ANR, adjustments being made in a repeating manner to cause fluctuations in the ANR.

7. The ANR control system of claim 1, wherein the perturbation-based control algorithm causes fluctuations in an amount of reductant injected with the reductant injector.

8. A method for controlling an ammonia-NOx ratio (ANR) for an internal combustion engine, the method comprising:

receiving a first signal from a sensor, the sensor being a NOx sensor or an $NH_3$ sensor;

determining a first command for a reductant injector based on the first signal;

adjusting the first command;

controlling the reductant injector based on the adjusted first command;

receiving a second signal from the sensor;

determining a second command for the reductant injector based on the second signal;

adjusting the second command via an algorithm that seeks an objective by making adjustments to commanded reductant injections; and controlling the reductant injector based on the adjusted second command, the adjustments to the first command and to the second command causing repeating variations in an amount of reductant injected via the reductant injector according to adjustments to the commanded reductant injections that are associated with the objective.

9. The method of claim 8, wherein the repeating variations are generated as part of an extremum-seeking control algorithm.

10. The method of claim 8, wherein the first command corresponds to a desired ANR, the adjustment to the first command causing a deviation from the desired ANR.

11. The method of claim 8, wherein the first command corresponds to a desired ANR, the adjustment to the first command causing a deviation from the desired ANR by an amount, a magnitude of the amount being based on an objective function or on a cost function.

12. The method of claim 8, wherein the first adjustment increases the ANR associated with the first command and the second adjustment decreases the ANR associated with the second command.

13. The method of claim 8, wherein the repeating variations are associated with a sinusoidal perturbation.

14. The method of claim 8, wherein the adjustments to at least one of the first command or the second command cause changes to the ANR in response to the internal combustion engine receiving a different fuel type.

15. A system for controlling an ammonia to NOx ratio (ANR) for an internal combustion engine, the system comprising:

an internal combustion engine configured to combust gaseous fuel;

an admission valve for providing the gaseous fuel to the internal combustion engine;

a catalyst connected to the internal combustion engine to receive exhaust formed by combustion of the gaseous fuel with the internal combustion engine;

a NOx sensor configured to detect oxygen present in the exhaust or an $NH_3$ sensor configured to detect $NH_3$ present in the exhaust; and a controller configured to:

receive signals output from the NOx sensor or from the $NH_3$ sensor, generate commands for controlling the admission valve, determine a desired ANR, and adjust the desired ANR by generating an adjusted ANR command that is above or that is below the desired ANR as part of an adaptive control strategy that generates fluctuations that change a magnitude and a sign of the adjusted ANR command.

16. The system of claim 15, wherein the adaptive control strategy employs extremum seeking control.

17. The system of claim 15, further including a temperature sensor, wherein the controller is further configured to transition from a mode in which the adaptive control strategy is enabled to a mode in which the adaptive control strategy is disabled based on temperature detected with the temperature sensor.

18. The system of claim 15, wherein the controller is further configured to employ proportional-integral control or proportional-integral-derivative control when the adaptive control strategy is disabled.

19. The system of claim 15, wherein the controller is further configured to employ proportional-integral control or proportional-integral-derivative control when a temperature associated with the catalyst is below a threshold temperature.

20. The system of claim 15, wherein the adaptive control strategy is configured to reduce a magnitude by which the adjusted ANR command is above or below the desired ANR based on an objective function or a cost function.

* * * * *